United States Patent [19]

Gell

[11] 4,156,511

[45] May 29, 1979

[54] TAPE CARTRIDGE

[75] Inventor: Peter Gell, Redfern, Australia

[73] Assignee: Tuscan Industries Pty. Limited, Redfern, Australia

[21] Appl. No.: 878,186

[22] Filed: Feb. 15, 1978

[30] Foreign Application Priority Data

Feb. 25, 1977 [AU] Australia .............................. PC9207

[51] Int. Cl.² ............................................ G11B 23/10
[52] U.S. Cl. ................................................... 242/197
[58] Field of Search ...................... 242/197, 71.1, 199, 242/198, 200, 71.2; 360/132, 96; 352/72, 78

[56] References Cited

U.S. PATENT DOCUMENTS

| | | | |
|---|---|---|---|
| 2,527,519 | 10/1950 | Bliss | 242/118.61 |
| 3,845,916 | 11/1974 | Livingston et al. | 242/197 |
| 3,858,829 | 1/1975 | Bradt et al. | 242/197 |
| 4,068,808 | 1/1978 | King | 242/118.7 |

Primary Examiner—George F. Mautz

Attorney, Agent, or Firm—Emory L. Groff, Jr.

[57] ABSTRACT

A cartridge with an interior chamber to house a spool, the cartridge comprising a first part and a second part, each part including a panel of resilient material so as to be flexible along one panel edge, alignment means to align the first and second parts and align coupling means to releasably couple the first and second parts together, said coupling means comprising engageable complementarily toothed lug and surface means respectively on the cartridge parts and rigid legs on the panel having said lug means with shoulder means on each of said legs to engage the edges of apertures in tongues on the other cartridge part when said flexible panel edges are flexed to take up convex and concave configurations to make the legs convergent in a direction extending away from the panel having the legs and the tongues divergent in a direction extending away from the panel having the tongues, and an opening in one panel to permit driving engagement of driving means with a spool when housed in said chamber.

5 Claims, 10 Drawing Figures

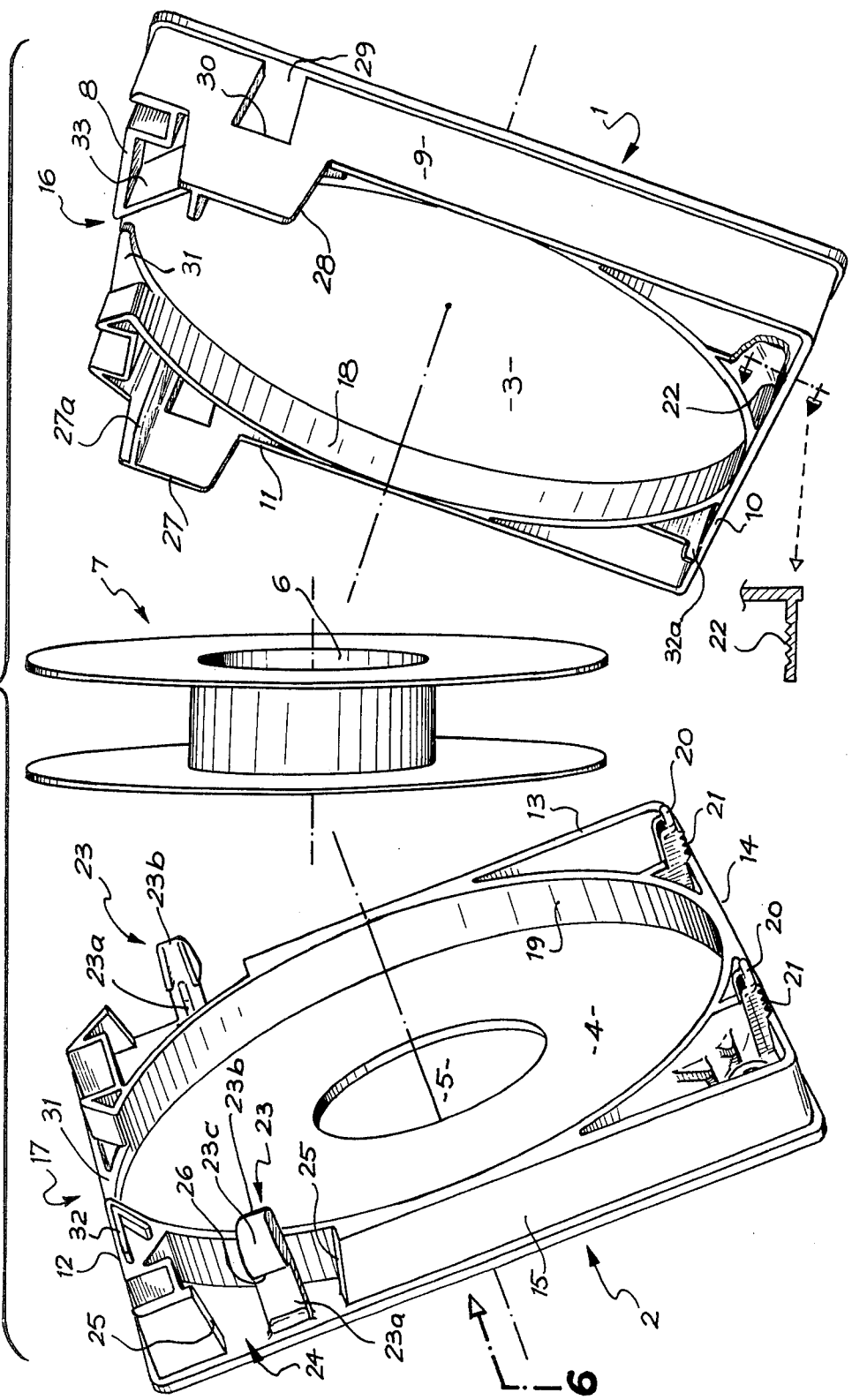

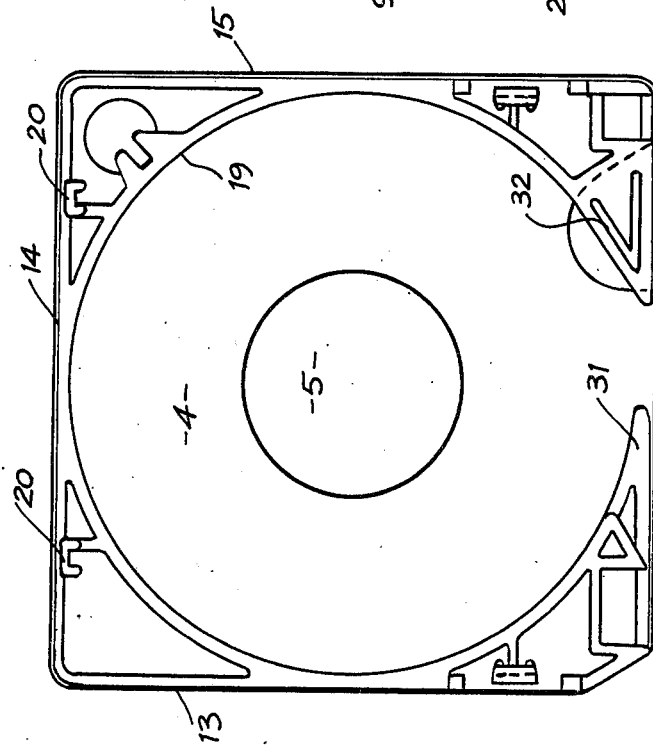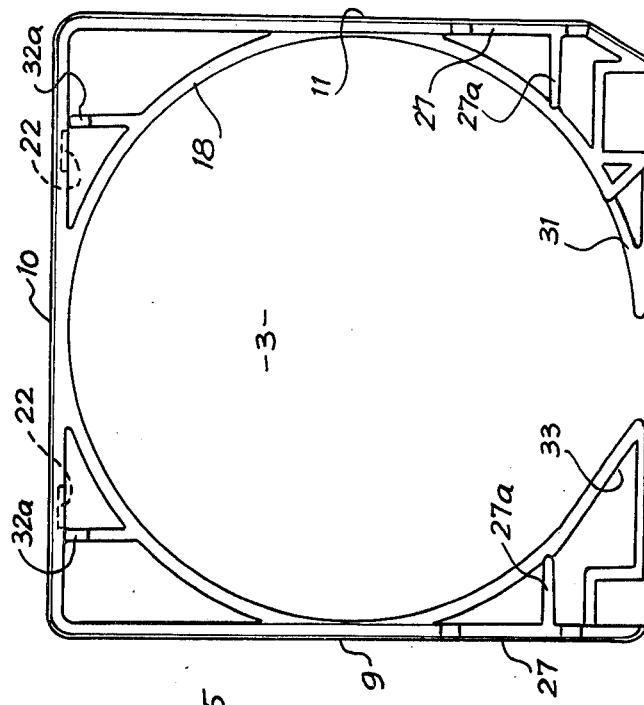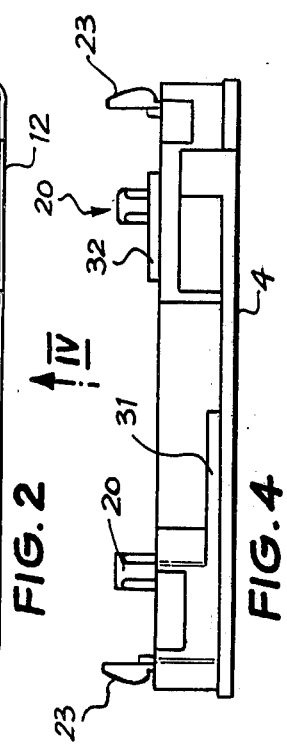

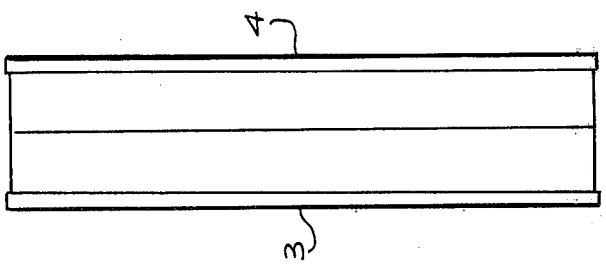
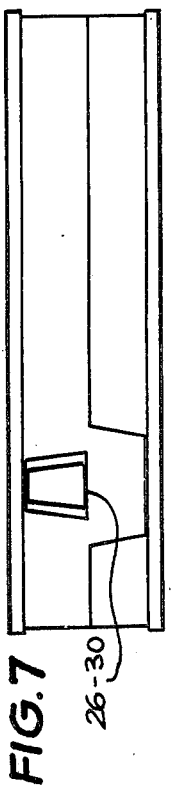
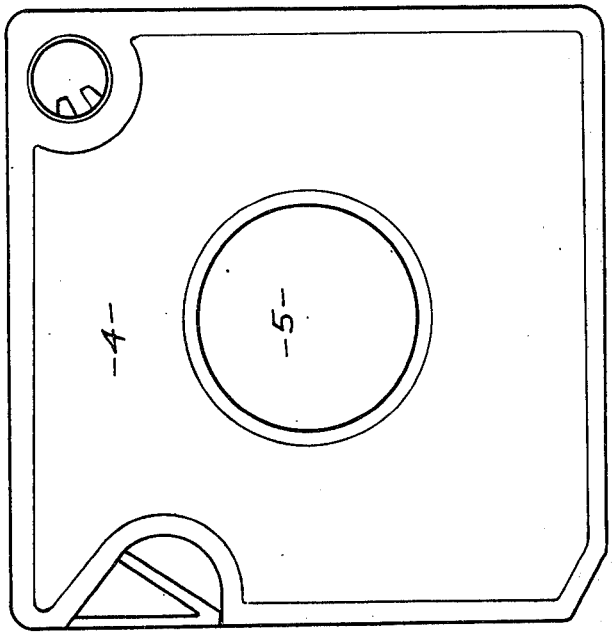
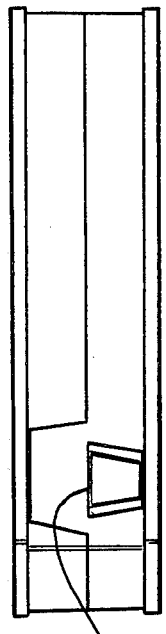
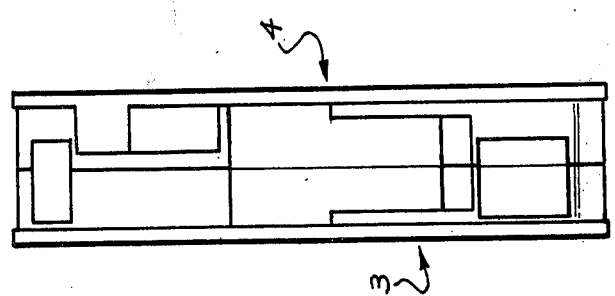

TAPE CARTRIDGE

This invention relates to a tape cartridge, particularly suited for the storage of magnetic recording tape.

Hitherto it has been common to provide a rectangular tape cartridge which comprised two complementary "halves" which when coupled together provided an enclosure for a spool. The spool was located and supported peripherally by wall means in the cartridge "halves". The cartridge had an opening in the periphery to allow tape on the spool to be withdrawn from the cartridge. There was also an opening in one of the "halves" which gave access to the hub of the spool to enable it to be coupled to drive means for the spool. The "halves" were substantially permanently connected together to encapsulate the spool. The connection of the "halves" was by screws. Such a cartridge is disclosed in U.S. Pat. No. 3,150,840.

The replacement of a spool in a cartridge as described required the removal of the connection means. This whilst appearing a simple operation, as only the use of a screwdriver was required, was a time consuming task for those persons required to replace spools.

The object of the present invention is to provide a cartridge which has "halves" which can be readily separated by the release of catch means.

More particularly, there is provided a cartridge to house a rotatable tape spool, said cartridge comprising a first part and a second part, each part including a rectangular panel of resilient material with upstanding edge flanges, alignment means to align corresponding flanges of the first and second parts and align coupling means to couple the first and second parts together to form a closed cartridge with an interior chamber to house a spool, aligned gaps in corresponding first flanges at first edges of the panels to provide access to the spool chamber, arcuate upstanding walls on each panel define said chamber and position said spool for rotation in the chamber, the upstanding arcuate walls and the flanges on the corresponding second, third and fourth edges of the panels substantially preventing flexure of the panel at those edges and the gaps in the first flanges permitting flexure of the panels along the first edges; said releasable coupling means comprising complementarily toothed upstanding lug means and surface means respectively at the third edges of the first and second panels which third edges lie opposite the first edges thereof, and rigid upstanding legs at the second and fourth edges of the panel having said lug means and adjacent the first edge thereof, shoulder means on each of said legs, rigid upstanding tongues on the flanges of the second and fourth edges of the panel not having the legs, said tongues engaging in notches in the corresponding flanges of the panel having the legs so as to align the first and second parts, and apertures in the tongues engagable by the shoulder means of the legs to releasably secure the parts together, said shoulder means being engagable in said apertures as a result of flexure of the first edges of the panels to convex and concave configuration to make the legs convergent in a direction extending away from the panel having the legs and the flanges divergent in a direction extending away from the panel having the flanges, and an opening in one panel to permit driving engagement of driving means with a spool when housed in said chamber.

A presently preferred form of the invention is described below with reference to the accompanying drawings in which:

FIG. 1 is an exploded perspective view of the two parts of the cartridge of the present invention and a spool for tape as would be used in the cartridge after assembly, FIG. 2 is a plan view looking at the interior of one part of the cartridge of FIG. 1, FIG. 3 is a plan view looking at the interior of the other part of the cartridge of FIG. 1, FIG. 4 is a view looking in the direction of arrow 4 on FIG. 2, FIG. 5 is a view looking in the direction of arrow 5 of FIG. 3, FIG. 6 is a side view of an assembled cartridge made up of the parts shown in FIG. 1 when viewed in the direction of arrow 6 of FIG. 1, FIG. 7 is a view looking in the direction of arrow 7 of FIG. 6, FIG. 8 is a view looking in the direction of arrow 8 of FIG. 6, FIG. 9 is a view looking in the direction of arrow 9 of FIG. 6, and FIG. 10 is a view looking in the direction of arrow 10 of FIG. 6.

Referring to the drawings, there are two cartridge parts 1 and 2, each part includes a panel 3 and 4. The panel 4 has a central hole 5 to permit driving engagement of a driving means (not shown) with the hub 6 of a spool 7 in known manner when housed in the cartridge.

There are upstanding edge flanges 8, 9, 10 and 11 on part 1 and like flanges 12, 13, 14 and 15 on part 2. The flanges 8 and 12 have gaps 16 and 17 respectively to give access to a chamber in the cartridge formed when the parts 1 and 2 are assembled to form the cartridge. Upstanding arcuate walls 18 and 19 of parts 1 and 2 respectively define the chamber which is dimensioned to position the spool central with the opening 5 and at the same time peripherally support the spool during its rotation. The walls 18 and 19 also combine with flanges 9 to 11 and 13 to 15 respectively to prevent flexure of the panels 3 and 4 along the edges associated with those flanges whilst the gaps in the flanges 8 and 12 (where there is no wall 18 or 19) permit the associated first panel edges to flex. The reasons for this will be described later. The parts are made of plastic material having resilience so that after flexing pressure applied to the first edges is released, the panel first edges will return to their normal straight condition.

The coupling means for releasably coupling the parts together comprises two spaced apart upstanding lugs 20 on the third flange 14 of the part 2 with outwardly directed lateral teeth 21. The lugs 20 are ribbed to make them substantially rigid. On the inner faces of the flange 10 of part 1 there are areas 22 having teeth of complimentary shape to the teeth 21. The coupling means also includes rigid upstanding legs 23 fixed to the panel 2 in line with notches 24 in flanges 13 and 15 and tied to the wall 19 by ribs. The notches 24 have sides 25 converging towards the panel 2. There is a shoulder 26 on each leg 23 and the legs 23 are so positioned and shaped that the body portions 23a thereof is aligned with the inner surface of the flange 15 and flange 13 and leading edges 23b of the legs 23 are likewise aligned. The shoulder 26 is formed by a bulbuous portion 23c the purpose of which will be described later in the disclosure relating to the assembly of the parts 1 and 2 into a closed cartridge.

The flanges 9 and 11 of part 1 have upstanding tongues 27 with rigidifying ribs 27a and sloping sides 28 spaced apart to engage the sides 25 of notches 24 when the parts 1 and 2 are joined together to form a cartridge. The tongues 27 each have an aperture 29 with an abutment edge 30 to snap under the shoulder 26 of the legs 23 as is later described. The teeth 21 by engaging with the teeth of areas 22, and the shoulders 26 by engaging the abutment edges 30 provide interlocking catch means to releasably secure the parts together.

The gaps 16 and 17 combine to form a mouth for the cartridge and lips 31 located in the mouth centralise film as it passes through the mouth in an unrolling or re-rolling operation of the film onto a spool housed within the cartridge.

As illustrated there is also a raised ridge 32 on part 2 to locate in a recess 33 in part 1 and dog 32a on part 1 to engage behind flange 14 of part 2 to assist in the alignment of the parts 1 and 2 in a coupling operation.

The parts are preferably made in a moulding operation and various other ribs apertures and openings are provided to enable the cartridge to be manufactured economically, with strength and in such a manner as to be adaptable to equipment with which the cartridge is intended to be used.

The method of engaging and disengaging the securing means of the parts involves flexure of a selected portion of each part 1 and 2, as outlined generally previously. More particularly, the flanges 9, 10, 11 combine with tongues 27 and the walls 19 to provide reinforcing means substantially preventing the flexure of the panel 1 along the panel edges associated with the flanges 9, 10, and 11. On the other hand the gap 8 of the first edge of the panel 1 provides a portion of the panel which is not reinforced against flexure and accordingly the panel may flex if force is applied to urge the terminal ends 34 of the tongues 27 apart. The result is a curvature in the first edge of the panel 1 and a mutual attitude of the tongues 27 which is divergent in the direction of the tongues away from the panel 1. For the same reason as pressure applied to the legs 23 to force them together results in a curvature in the first edge of the panel 2 and a mutual attitude of the legs 23 which is convergent in the direction of the legs 23 away from the panel 2. It follows from the foregoing that by engaging the teeth 21 with the toothed areas 22 and inserting the curved leading edges 23b of the legs 23 between the terminal ends 34 of the tongues 27 and applying pressure to bring the two parts together the first edges of the panels will curve as outlined above to accommodate the difference in width between the bulbuous portions 23c of the legs 23 and the inner surfaces of the tongues 27, this permits the bulbuous portions 23c of the legs 23 to slide over the inner surfaces of the tongues 27 until substantially simultaneously the edges 28 of the tongues 27 register with the sides 25 of the notches 24 and the shoulders 26 snap under the abutment edges 30 of the tongues 27.

Separating the parts is achieved by applying transverse pressure to create the curvature described above in the first edges of the parts with associated separating force allowing the shoulder 26 to disengage from below the abutment edge 30. Alternatively if sufficient separating force is applied, without any lateral force, the flexure described above can be induced with the required disengagement of the shoulders 26 with the abutment edges 30.

I claim:

1. A cartridge to house a rotatable tape spool, said cartridge comprising a first part and a second part, each part including a rectangular panel of resilient material with upstanding edge flanges, releasable coupling means on said first and second parts, alignment means to align corresponding flanges of first and second parts and align said releasable coupling means to couple the first and second parts together to form a closed cartridge with an interior chamber to house a spool, aligned gaps in corresponding first flanges at first edges of the panels to provide access to the spool chamber, arcuate upstanding walls on each panel defining said chamber and positioning said spool for rotation in the chamber, the upstanding arcuate walls and the flanges on the corresponding second, third and fourth edges of the panels substantially preventing flexure of the panel at those edges and the gaps in the first flanges permitting flexure of the panels along the first edges; said releasable coupling means comprising complementary toothed upstanding lug means and surface means respectively at the third edges of the first and second panels which third edges lie opposite the first edges thereof and rigid upstanding legs at the second and fourth edges of the panel having said lug means and adjacent the first edge thereof, shoulder means on each of said legs, rigid upstanding tongues on the flanges of the second and fourth edges of the panel not having the legs, said tongues engaging in notches in the corresponding flanges of the panel having the legs so as to align the first and second parts, and apertures in the tongues engagable by the shoulder means of the legs to releasably secure the parts together by rotationless superimposition, said shoulder means being engagable in said apertures as a result of flexure of the first edges of the panels to convex and concave configuration to make the legs convergent in a direction extending away from the panel having the legs and the flanges divergent in a direction extending away from the panel having the flanges, and an opening in one panel to permit driving engagement of driving means with a spool when housed in said chamber.

2. A cartridge as claimed in claim 1 including lips on the panels in said aligned gaps to centralise the tape with said mouth as the tape is unrolled from or re-rolled on a spool in said chamber.

3. A cartridge as claimed in claim 1 wherein said arcuate wall in each part comprises a single wall being the major part of the circumference of a circle.

4. A cartridge as claimed in claim 1 wherein said toothed surface means is a toothed area on the inner surface of the flange of one part at the third edge thereof.

5. A cartridge as claimed in claim 2 wherein each tongue has edges in the plane of its associated flange which edges converge in the direction of the tongue away from its associated flange and the notches have correspondingly located sides which diverge.

* * * * *